United States Patent [19]

Meeker

[11] 4,231,612
[45] Nov. 4, 1980

[54] BABY CARRIER AND CAR SEAT

[75] Inventor: Paul K. Meeker, Kent, Ohio

[73] Assignee: Questor Corporation, Toledo, Ohio

[21] Appl. No.: 938,874

[22] Filed: Sep. 1, 1978

Related U.S. Application Data

[63] Continuation of Ser. No. 845,776, Oct. 26, 1977, abandoned.

[51] Int. Cl.² .............................................. A47D 1/10
[52] U.S. Cl. .................................. 297/250; 297/327
[58] Field of Search ............... 297/250, 253, 254, 326, 297/327, 328, 377; 248/371

[56] References Cited

U.S. PATENT DOCUMENTS

| | | | |
|---|---|---|---|
| 278,241 | 5/1883 | Krill. | |
| 656,256 | 8/1900 | Leisenring. | |
| 809,596 | 1/1906 | Witte. | |
| 1,725,427 | 8/1929 | Stusak. | |
| 1,788,113 | 1/1931 | Leach. | |
| 1,994,021 | 3/1935 | Heller. | |
| 2,158,453 | 5/1939 | Wood. | |
| 2,889,152 | 6/1959 | Hurst et al. | 297/327 |
| 2,938,573 | 5/1960 | Stanley | 248/371 |
| 3,043,624 | 7/1962 | Mason | 297/326 X |
| 3,235,304 | 2/1966 | Glass. | |
| 3,302,970 | 2/1967 | Rizzato. | |
| 3,409,325 | 11/1968 | Hamilton et al. | |
| 3,976,328 | 8/1976 | Stahel | 297/377 |
| 3,992,056 | 11/1976 | Koziatek et al. | 297/250 |

*Primary Examiner*—Francis K. Zugel
*Attorney, Agent, or Firm*—John E. Benoit; Donald R. Bahr

[57] ABSTRACT

There is shown an infant car seat having a seat, back and sides. Support stands are connected to a plate member within compartments on either side of said seat which are in turn, pivotally connected to the side members of the seat. These plate members have an arcuate upper face with internal teeth extending downwardly therefrom. Buttons are spring biased within each of the compartments and extend through the upper walls thereof. The button has an extending portion which includes a compartment wherein the spring is placed between the upper section of the compartment and the pivot retaining means in order to bias the button upwardly. The upper portion of the button compartment contains teeth which mate with the teeth of the plate. The seat may be adjusted to various positions by depressing the buttons on either side of the seat and rotating the seat about the pivot point. The seat also contains two recesses, one on either side of the upper face of the side of the seat, which accept the auto seat belt when the seat is facing in the rearward direction in the automobile. The pivot point and the auto seat belt slots are so selected that the resulting vector force of the dynamic force and load and the retaining force of the seat belt is in a downward direction through the pivot point.

3 Claims, 6 Drawing Figures

BABY CARRIER AND CAR SEAT

This is a continuation of application Ser. No. 845,776, filed Oct. 26, 1977 now abandoned.

The present invention relates generally to baby carriers and more specifically to a light weight baby carrier which may be used as a baby carrier, seat and as a car seat.

Both baby seats and car seats are well known and available in various forms. Recent federal regulations have changed the type of seat which may be used as an infant car seat. In order to be acceptable and to pass these regulations, certain impact and force tests must be met. This has resulted in car seats which are bulky and relatively heavy and, therefore, difficult for a mother to handle while she is carrying the infant.

While baby seats have been devised which are fairly light weight, and in which the baby may be placed in varying positions, such seats, to my knowledge, are not designed for use in an automobile, nor would they pass the restrictions presented by the above mentioned federal regulations. This obviously necessitates the need for both a baby seat and a car seat.

The present invention, accordingly, provides a single seat in which the baby may sit, sleep, be fed, or be placed in an automobile in a safe secure manner.

Another object of this invention is to provide a baby seat which is adjustable to various reclining positions and wherein such adjustment may easily be made without having to remove the baby from the seat or unnecessarily disturb him while changing seat positions.

A further object of this invention is to provide a baby seat which also may be used as an infant car seat, and wherein the use of the auto belt is so designed that the dynamic forces are properly placed in the event of a crash.

These and other objects of the invention will become apparent from the following description when taken in conjunction with the drawings wherein.

Broadly speaking, the present invention provides an infant car seat having a seat, back and sides. Support stands are connected to a plate member within compartments on either side of said seat which are in turn, pivotally connected to the side members of the seat. These plate members have an arcuate upper face with internal teeth extending downwardly therefrom. Buttons are spring biased within each of the compartments and extend through the upper walls thereof. The button has an extending portion which includes a compartment wherein the spring is placed between the upper section of the compartment and the pivot retaining means in order to bias the button upwardly. The upper portion of the button compartment contains teeth which mate with the teeth of the plate. The seat may be adjusted to various positions by depressing the buttons on either side of the seat and rotating the seat about the pivot point. The seat also contains two recesses, one on either side of the upper face of the side of the seat, which accept the auto seat belt when the seat is facing in the rearward direction in the automobile. The pivot point and the auto seat belt slots are so selected that the resulting vector force of the dynamic force and load and the retaining force of the seat belt is in a downward direction through the pivot point.

Figure 1:
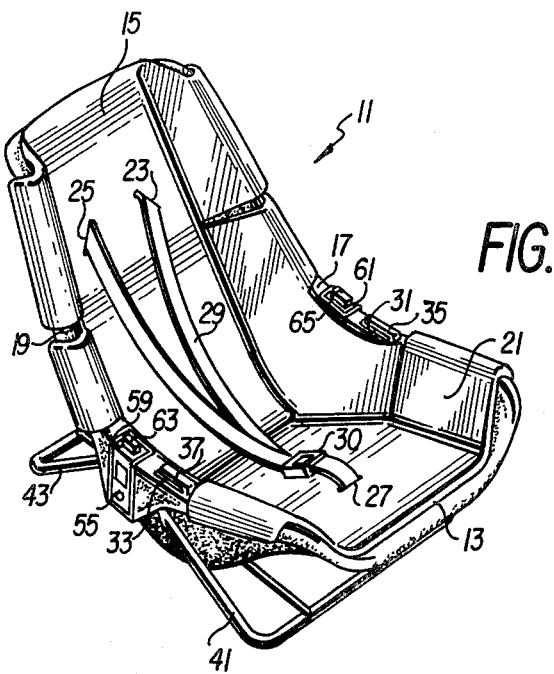
FIG. 1 is a perspective view of one form of the seat of the present invention.

Turning now more specifically to the drawings, there is shown in FIG. 1 the baby carrier 11 of the present invention having a seat 13, back 15 and sides 17 and 19. The seat and the sides are generally covered with a padded cover 21 for the comfort of the infant. Extending through the back and seat of both the car seat and the padded cover are slots 23, 25 and 27 which accept a seat belt associated therewith. The belt is used in the usual manner together with the clasp 30.

On the upper face on either side of the seat there are slots 31 and 33 which are created by extending integral fingers 35 and 37 for purposes which will become apparent as the description proceeds.

Figure 3:
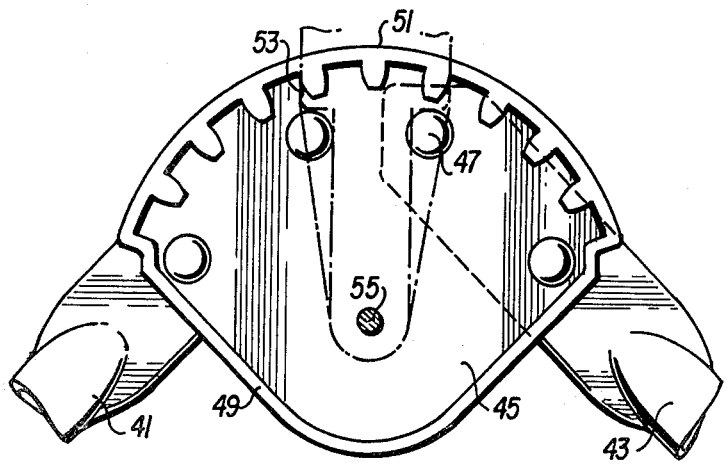
FIG. 3 is a partial elevational view of part of the adjusting mechanism of the present invention.

In order to support the seat, there are provided two U-shaped support stands 41 and 43. These are secured to plates 45 on the opposite sides of the seat, as more clearly shown in FIG. 3, by means such as rivets 47. It is to be understood that the mechanisms on opposite sides of the seat are identical and, accordingly, only one such meahanism will be described herein. Plate 45 has a flange 49 about the outer circumference thereof with the upper section 51 of the plate 45 assuming an arcuate shape. The arcuate section 51 contains integral downwardly extending teeth 53. The plate 45 is pivotably secured to the side of the seat by means such as bolt 55 as is more clearly seen in FIG. 4.

Figure 4:
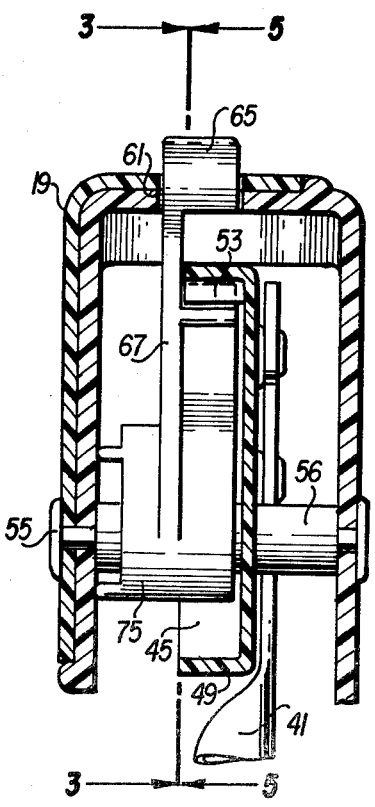
FIG. 4 is a sectional view taken along the lines 4—4 of FIG. 2.
Figure 5:
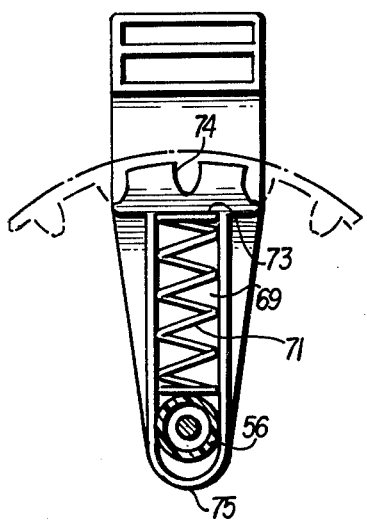
FIG. 5 is an elevational view of the mating part of the mechanism associated with the mechanism shown in FIG. 2.

The upper section of the compartment formed in the side wall has an aperture 61 therein through which button 65 extends. Referring to FIG. 4, button 65 has an extension integral therewith which passes downwardly within the compartment. This extension has an interior 69, as shown in FIG. 5, which contains a helical spring 71. This spring is a compression spring which is contained between the upper wall of the interior of the extension and the spacer section 56 of the pivot. This spring biases the button in the upper direction in the position shown in FIG. 4.

Figure 2:
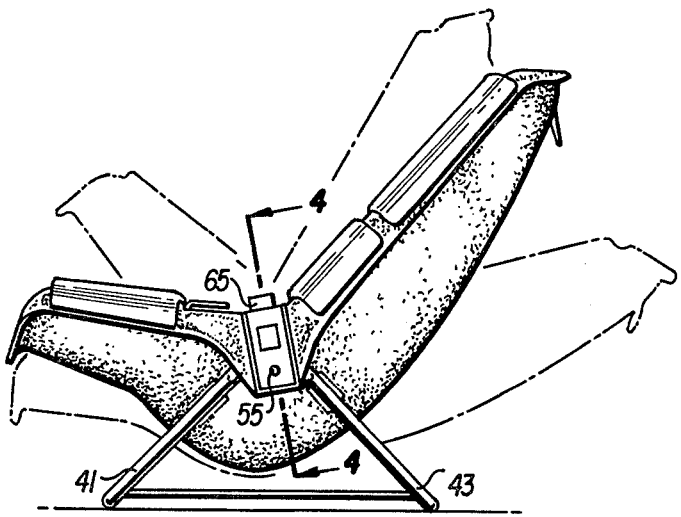
FIG. 2 is a side elevational view showing the seat of the present invention and the various positions which may be used with the seat.

Above the interior, there are a plurality of teeth 74 which are designed to mate with the teeth 53 on the plate 45. Thus, when the button 65 is depressed the entire seat is, in effect, rotated about the pivot point 55 to the position desired as indicated in FIG. 2. As will be evident, it is very simple for the person operating the chair to merely reach down and depress both buttons and move the seat to the position desired without disturbing the infant to any degree.

Figure 6:
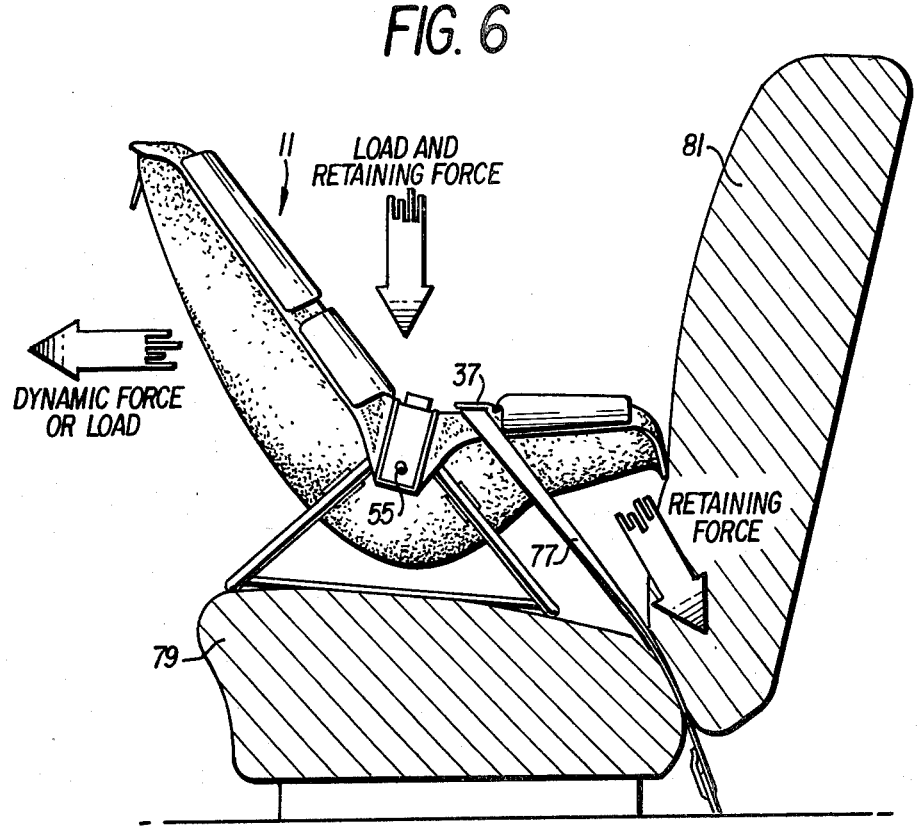
FIG. 6 is an elevational view showing the seat used as an infant car seat.

FIG. 6 shows the seat as it is to be used in an automobile in the preferred rearward facing direction. As indicated, the auto seat belt 77 passes through the slots created by the integral fingers 37 and, thus, hold the seat downwardly against the seat portion 79 and the back section 81. The seat is located and retained in position such that the dynamic force or the load which is created by a collision or the like or sudden breaking, and the retaining force of the seat belt form a vector force component which passes directly down through the pivot point 55.

This is the desired location of the force since, if this relationship is changed, the carrier during dynamic action would tilt excessively or break. Thus, the mechanism not only provides various sitting angle adjustments, but also provides point of equalizing dynamic forces as shown in FIG. 6.

All seats of which I am aware, which use tilting lock mechanisms have the locking plunger afixed on the leg portion of the unit. The present invention uses a locking plunger which is afixed to the seat for tilting of the unit. By reversing the locking plunger in this manner, the shell of the seat becomes a functional part of the total design mechanism. Additionally, these mechanisms are operated by a lever which normally requires a pulling action. The mechanism of the present invention has an integral teeth arrangement and requires a pushing force rather than a pulling force. This action provides a means for the person adjusting the carrier to securely grasp the shell during changing of the sitting angle, thus allowing the child to remain in the seat basically undisturbed during the adjustment.

The above description and drawings are illustrative only since specific elements could be altered without departing from the invention. Accordingly, the invention is to be limited only by the scope of the following claims.

I claim:

1. In a baby carrier and car seat having a seat, back and sides; tilting, supporting and locking devices on opposite sides of said seat, each of said tilting and locking mechanisms comprising
   a compartment secured to said side;
   a plate member having a peripheral arcuate flange;
   means for pivotally mounting said plate member to said side and within said compartment;
   a support stand secured to said plate member and pivotable therewith;
   a plurality of teeth depending from the inner side of said arcuate flange;
   a depressable button member adjacent said plate member and extending upwardly through said compartment;
   a plurality of teeth on said button member of a configuration so as to nest with said teeth on said plate member; and
   spring means within said compartment for biasing said button member in a direction so as to cause said teeth to mesh.

2. The baby carrier and car seat of claim 1 further comprising
   slot means in said sides for accepting an auto seat belt.

3. The baby carrier and car seat of claim 2 wherein said means for pivotally mounting said plate and said slot means are located in a position relative to each other such that the combined vector force of impact and load force and retaining force passes substantially through the point of pivotal mounting.

* * * * *